(12) United States Patent
Zhu et al.

(10) Patent No.: US 10,312,547 B2
(45) Date of Patent: Jun. 4, 2019

(54) CROSS-WOVEN ELECTRODE ASSEMBLY

(71) Applicants: Bosch Battery Systems, LLC, Orion, MI (US); Robert Bosch GmbH, Stuttguart (DE)

(72) Inventors: Yunlu Zhu, Ann Arbor, MI (US); Mehul Botadra, Sterling Heights, MI (US)

(73) Assignees: Robert Bosch Battery Systems LLC, Orion, MI (US); Robert Bosch GmbH, Stuttgart (DE)

( * ) Notice: Subject to any disclaimer, the term of this patent is extended or adjusted under 35 U.S.C. 154(b) by 760 days.

(21) Appl. No.: 14/952,431

(22) Filed: Nov. 25, 2015

(65) Prior Publication Data

US 2017/0149092 A1   May 25, 2017

(51) Int. Cl.
*H01M 10/0583*   (2010.01)
*H01M 10/04*   (2006.01)
*H01M 10/052*   (2010.01)

(52) U.S. Cl.
CPC ..... *H01M 10/0583* (2013.01); *H01M 10/045* (2013.01); *H01M 10/0431* (2013.01); *H01M 10/052* (2013.01)

(58) Field of Classification Search
None
See application file for complete search history.

(56) References Cited

U.S. PATENT DOCUMENTS

| 5,116,698 | A | 5/1992 | Sears |
| 6,037,077 | A | 3/2000 | Nowaczyk |
| 7,871,722 | B2 | 1/2011 | Shin et al. |
| 8,679,677 | B1 | 3/2014 | Tamaki et al. |
| 8,945,744 | B2 | 2/2015 | Kwon et al. |
| 9,246,185 | B2 | 1/2016 | Kretschmar et al. |
| 2004/0161662 | A1 | 8/2004 | Kim et al. |
| 2012/0177953 | A1 | 7/2012 | Bhardwaj et al. |
| 2013/0252086 | A1 | 9/2013 | Stern et al. |
| 2014/0050958 | A1 | 2/2014 | Kwon et al. |
| 2014/0322575 | A1 | 10/2014 | Hwang et al. |
| 2015/0093617 | A1 | 4/2015 | Yoon |

FOREIGN PATENT DOCUMENTS

| JP | 2011138675 | 7/2011 |
| JP | 2013098502 | 5/2013 |
| JP | 2014035998 | 2/2014 |
| WO | 2013/152149 A1 | 10/2003 |
| WO | 2013/176534 A1 | 11/2013 |

OTHER PUBLICATIONS

Kanetake et al JP 2014/035998 English translation obtained from Google Patents Oct. 16, 2018 (Year: 2018).*
PCT International Search Report for PCT/EP2016/078364 dated Feb. 6, 2017 (4 pages).

* cited by examiner

*Primary Examiner* — Sarah A. Slifka
(74) *Attorney, Agent, or Firm* — Kelly McGlashen; Maginot Moore & Beck LLP

(57) ABSTRACT

A electrode assembly includes an electrode pair having a positive electrode and a negative electrode that are arranged crosswise and each z-folded while being cross-woven together in a continuous manner. The electrode assembly includes an electrode stack in which portions of the positive electrode are stacked along a stack axis so as to alternate with portions of the negative electrode.

16 Claims, 11 Drawing Sheets

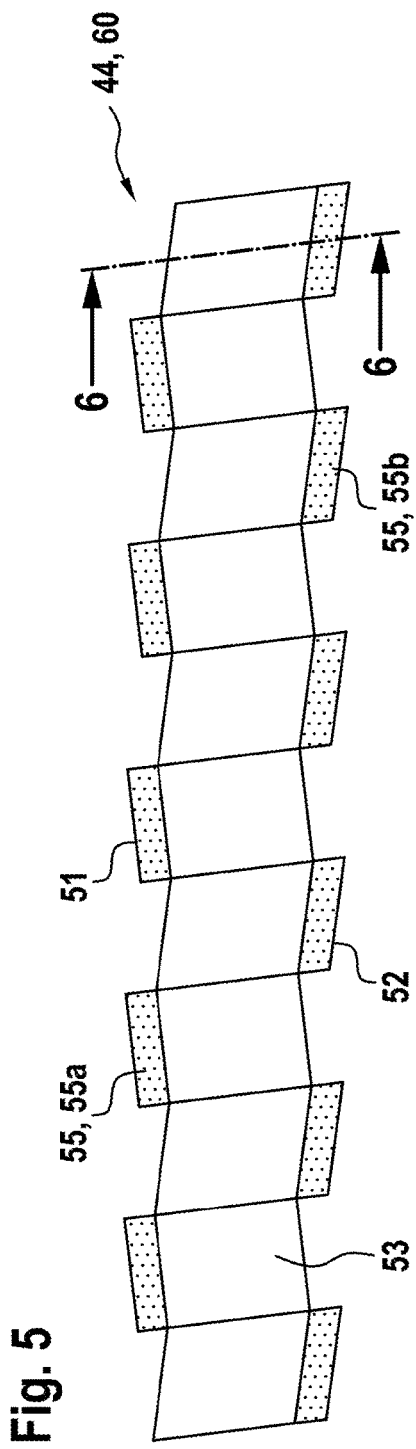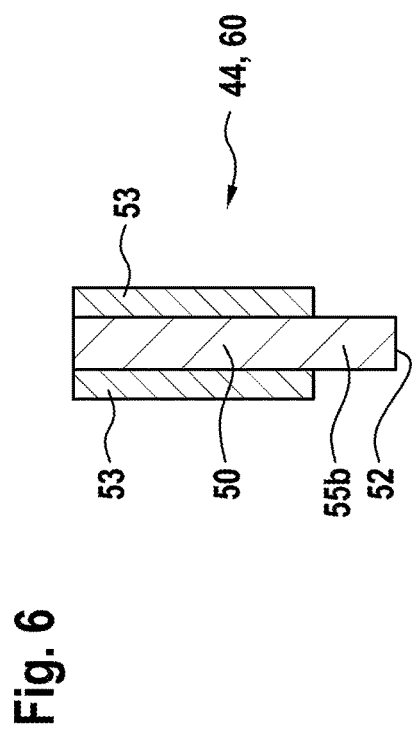

CROSS-WOVEN ELECTRODE ASSEMBLY

BACKGROUND

1. Field of the Invention

The present invention relates to an electrode assembly for an energy storage device that includes a cross-woven arrangement of z-folded positive and negative electrodes, where the positive electrode is interwoven with the negative electrode so that a lengthwise axis of the positive electrode is perpendicular to a lengthwise axis of the negative electrode.

2. Description of the Related Art

Battery packs provide power for various technologies ranging from portable electronics to renewable power systems and environmentally friendly vehicles. For example, hybrid electric vehicles use a battery pack and an electric motor in conjunction with a combustion engine to increase fuel efficiency. Battery packs are formed of a plurality of electrochemical cells. The cells are arranged in two or three dimensional arrays and are electrically connected in series or in parallel.

Different cell types have emerged in order to deal with the space requirements of a very wide variety of installation situations, and the most common types used in vehicles are cylindrical cells, prismatic cells, and pouch cells. Regardless of cell type, each cell includes an electrode assembly that is sealed within a cell housing along with an electrolyte to form a power generation and storage unit. The electrode assembly may include an alternating arrangement of positive and negative electrode elements separated by intermediate separator plates, and can be provided in various configurations, including a stacked arrangement of individual sheets, winding an elongated electrode pair into a jelly-roll arrangement, or z-folding an elongated electrode pair into an approximation of the stacked arrangement.

The energy production volumetric efficiency of the cell, as determined by the ratio of (the volume of the electrode assembly disposed within the cell) to (the volume of the cell housing), is relatively low. For example, some cylindrical cells having a jelly-roll electrode assembly may be 80 to 90 percent volumetrically efficient, and some prismatic cells having a jelly-roll electrode assembly may be 60-75 percent volumetrically efficient. Traditionally, a prismatic or pouch type cell having a stacked arrangement of individual electrode plates can be more volumetrically efficient than one having a jelly-roll arrangement, but manufacture of the stacked arrangement is more difficult and prone to mistakes and thus more expensive than that of the jelly roll arrangement. Although z-folding addresses some manufacturing disadvantages of the stacked arrangement, some z folded electrode assemblies have relatively low energy producing capacity due to single sided application of active material to the electrode. Thus, it is desirable to increase the energy production volumetric efficiency of the cell while employing a relatively low cost electrode assembly.

SUMMARY

In some aspects, an electrode assembly includes a positive electrode, and a negative electrode that is cross-woven with the positive electrode. One of the positive electrode and the negative electrode is disposed between a first separator and a second separator to form an alpha electrode, and the other one of the positive electrode and the negative electrode forms a beta electrode. The alpha electrode is arranged in a series of z folds in which the alpha electrode is folded in a first direction about an axis parallel to a first fold axis so that a second portion of the alpha electrode overlies a first portion of the alpha electrode, and folded in a second direction about another axis parallel to the first fold axis so that a third portion of the alpha electrode overlies the first portion of the alpha electrode. The first direction is opposed to the second direction, and the first portion of the alpha electrode, the second portion of the alpha electrode, and the third portion of the alpha electrode are arranged in a stacked configuration defining a stack axis. In addition, the beta electrode is arranged in a series of z folds in which the beta electrode is folded in a third direction about an axis parallel to a second fold axis so that a second portion of the beta electrode overlies a first portion of the beta electrode, and folded in a fourth direction about another axis parallel to the second fold axis so that a third portion of the beta electrode overlies the first portion of the beta electrode. The third direction is opposed to the fourth direction, and the second fold axis is perpendicular to the first fold axis and the stack axis. The z folds of the alpha electrode are woven with the z folds of the beta electrode such that the first, second and third portions of the beta electrode are stacked along the stack axis so as to alternate with the first, second and third portions of the alpha electrode.

The electrode assembly may include one or more of the following features: The alpha electrode and the beta electrode each have a thin, elongated shape and include a lengthwise dimension corresponding to the direction of elongation, a width dimension in a direction perpendicular to, and smaller than, the lengthwise dimension, and a thickness dimension in a direction perpendicular to both the lengthwise and width dimensions. The thickness dimension is smaller than the width dimension, the first fold axis is perpendicular to the lengthwise dimension of the alpha electrode, and the second fold axis is perpendicular to the lengthwise dimension of the beta electrode. The positive electrode comprises a first substrate formed of a first electrically-conductive material, the positive electrode having a first active material disposed on both sides of the first substrate, and the negative electrode comprises a second substrate formed of a second electrically-conductive material, the negative electrode having a second active material disposed on both sides of the second substrate. The first electrically-conductive material is different from the second electrically-conductive material, and the first active material is different from the second active material. The first active material is provided along the entire length of the first substrate such that a space exists between lengthwise edges of the positive electrode and the first active material, whereby a positive clear lane of bare substrate is provided along each lengthwise edge of the positive electrode, and the second active material is provided along the entire length of the second substrate such that a space exists between lengthwise edges of the negative electrode and the second active material, whereby a negative clear lane of bare substrate is provided along each lengthwise edge of the negative electrode. The positive clear lanes are periodically notched such that positive tabs are formed along the lengthwise edges of the positive electrode between adjacent notches, and the negative clear lanes are periodically notched such that negative tabs are formed along the lengthwise edges of the negative electrode between adjacent notches. The tabs of the alpha electrode protrude beyond the first separator and the second separator. The positive tabs on one lengthwise edge of the positive electrode are offset along the length direction from the positive tabs of an opposed lengthwise edge of the positive electrode, and the negative tabs on one lengthwise edge of the negative electrode are offset along the length direction from the negative tabs of an opposed lengthwise edge of the negative electrode.

The electrode assembly may also include one or more of the following additional features: A lengthwise edge of each of the alpha electrode and the beta electrode is periodically notched and tabs are formed along the lengthwise edge between adjacent notches. The tabs are electrically conductive and free of active material. Opposed lengthwise edges of each of the alpha electrode and the beta electrode are periodically notched and tabs are formed along the lengthwise edges between adjacent notches, and for each of the alpha electrode and the beta electrode, the notches on one lengthwise edge are offset along the length direction from the notches of an opposed lengthwise edge. The tabs are electrically conductive and free of active material. The tabs of the alpha electrode protrude beyond the first separator and the second separator. The other one of the positive electrode and the negative electrode is free of separators.

In some aspects, an electrode assembly includes a positive electrode and a negative electrode. One of the positive electrode and the negative electrode is disposed between a first separator and a second separator to form an insulated electrode. The insulated electrode is arranged in z-folds about first fold lines that are parallel to a first axis, the other of the positive electrode and the negative electrode is arranged in z-folds about second fold lines that are parallel to a second axis, and the second axis is perpendicular to the first axis. The insulated electrode is cross-woven with the other of the positive electrode and the negative electrode such that portions of the insulated electrode between adjacent first fold lines are stacked in an alternating manner with portions of the other of the positive electrode and the negative electrode between adjacent second fold lines to form an assembly of the portions that is stacked along a third axis that is perpendicular to both the first axis and the second axis.

In some aspects, an electrochemical cell includes a cell housing, and an electrode assembly disposed in the cell housing. The electrode assembly includes a positive electrode and a negative electrode. One of the positive electrode and the negative electrode is disposed between a first separator and a second separator to form an alpha electrode, and the other one of the positive electrode and the negative electrode forms a beta electrode. The alpha electrode is arranged in a series of z folds in which the alpha electrode is folded in a first direction about an axis parallel to a first fold axis so that a second portion of the alpha electrode overlies a first portion of the alpha electrode, and folded in a second direction about another axis parallel to the first fold axis so that a third portion of the alpha electrode overlies the first portion of the alpha electrode. The first direction is opposed to the second direction, and the first portion of the alpha electrode, the second portion of the alpha electrode, and the third portion of the alpha electrode are arranged in a stacked configuration defining a stack axis. In addition, the beta electrode is arranged in a series of z folds in which the beta electrode is folded in a third direction about an axis parallel to a second fold axis so that a second portion of the beta electrode overlies a first portion of the beta electrode, and folded in a fourth direction about another axis parallel to the second fold axis so that a third portion of the beta electrode overlies the first portion of the beta electrode. The third direction is opposed to the fourth direction, and the second fold axis is perpendicular to the first fold axis and the stack axis. The z folds of the alpha electrode are woven with the z folds of the beta electrode such that the first, second and third portions of the beta electrode are stacked along the stack axis so as to alternate with the first, second and third portions of the alpha electrode.

In some aspects, a method of forming an electrode assembly that includes a positive electrode and a negative electrode is provided. The method includes disposing one of the positive electrode and the negative electrode between a first separator and a second separator to form an alpha electrode, and using the other one of the positive electrode and the negative electrode to form a beta electrode. The method includes arranging the alpha electrode in a first series of z folds, and, while arranging the alpha electrode in the first series of z-folds, also arranging the beta electrode in a second series of z folds that is interwoven with the first series of z-folds to provide an electrode stack in which portions of the beta electrode are stacked along a stack axis so as to alternate with portions of the alpha electrode.

The method may include one or more of the following features and/or method steps: The step of arranging the alpha electrode in a first series of z folds includes arranging the alpha electrode such that each z fold in the first series of z folds includes folding the alpha electrode in a first direction about an axis parallel to a first fold axis so that a second portion of the alpha electrode overlies a first portion of the alpha electrode, and folding the alpha electrode in a second direction about another axis parallel to the first fold axis so that a third portion of the alpha electrode overlies the first portion of the alpha electrode. The first direction is opposed to the second direction, and the first portion of the alpha electrode, the second portion of the alpha electrode, and the third portion of the alpha electrode being arranged in a stacked configuration defining the stack axis. The step of arranging the beta electrode in a second series of z folds includes arranging the beta electrode such that each z-fold in the second series of z folds includes folding the beta electrode in a third direction about an axis parallel to a second fold axis so that a second portion of the beta electrode overlies a first portion of the beta electrode, and folding the beta electrode in a fourth direction about another axis parallel to the second fold axis so that a third portion of the beta electrode overlies the first portion of the beta electrode. The third direction is opposed to the fourth direction, and the second fold axis is perpendicular to the first fold axis and the stack axis. Interweaving the second series of z folds with the first series of z folds provides an electrode stack in which the first, second and third portions of the beta electrode are stacked along the stack axis so as to alternate with the first, second and third portions of the alpha electrode. The alpha electrode and the beta electrode each have a thin, elongated shape and include a lengthwise dimension corresponding to the direction of elongation, a width dimension in a direction perpendicular to, and smaller than, the lengthwise dimension, and a thickness dimension in a direction perpendicular to both the lengthwise and width dimensions, the thickness dimension being smaller than the width dimension, and the steps of arranging the alpha electrode and arranging the beta electrode include orienting the alpha electrode and the beta electrode such that the lengthwise dimension of the alpha electrode is perpendicular to the lengthwise dimension of the beta electrode. Prior to the steps of arranging the alpha electrode and arranging the beta electrode, stacking first portions of each of the alpha electrode and the beta electrode such that a lengthwise edge of the alpha electrode extends in a direction perpendicular to a lengthwise edge of the beta electrode.

Advantageously, the cell including the electrode assembly having a cross-woven z-fold configuration is advantageous since it provides a volumetric efficiency that is similar to that of a stacked plate electrode configuration, while having manufacturing advantages relative to the stacked plate configuration since the method for forming the cross-woven z-fold electrode configuration is a continuous process. In particular, the manufacturing process for forming the cross-woven z-fold electrode configuration is faster and lower cost than the manufacturing process for forming a stacked plate electrode configuration.

The positive and negative electrodes used to form the cross-woven z-fold electrode configuration each include a substrate having an active material deposited on both sides of the substrate. This can be compared to some electrodes used to form a z-folded electrode configuration having a substrate that includes the active material deposited on only one side. Thus, the cross-woven z-fold electrode assembly provides twice the capacity of such single-sided z-folded electrode assemblies.

BRIEF DESCRIPTION OF THE DRAWINGS

FIG. 5 is a perspective view of the positive (beta) electrode.

FIG. 6 is a cross-sectional view of the electrode of FIG. 5 as seen along line 6-6.

DETAILED DESCRIPTION

Figure 1:
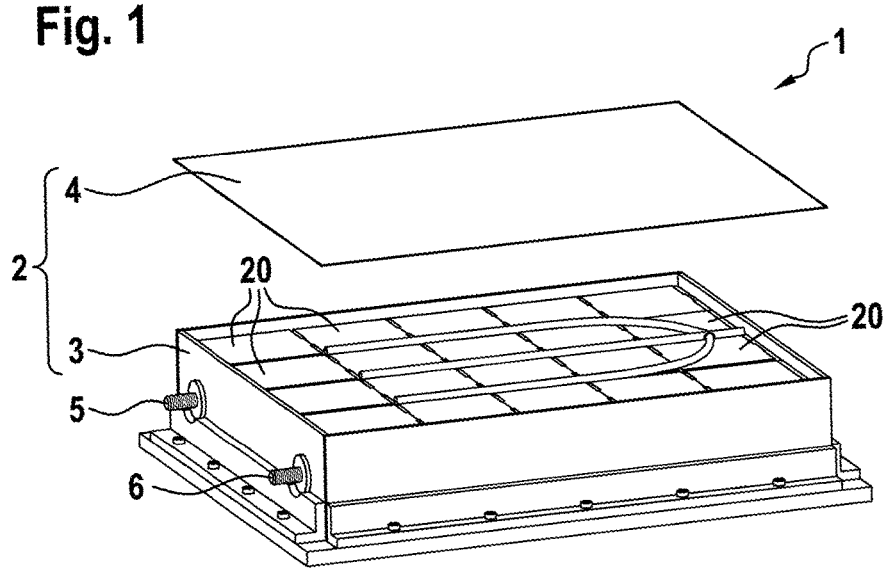
FIG. 1 is an exploded perspective view of a battery pack including an array of pouch cells.
Figure 2:
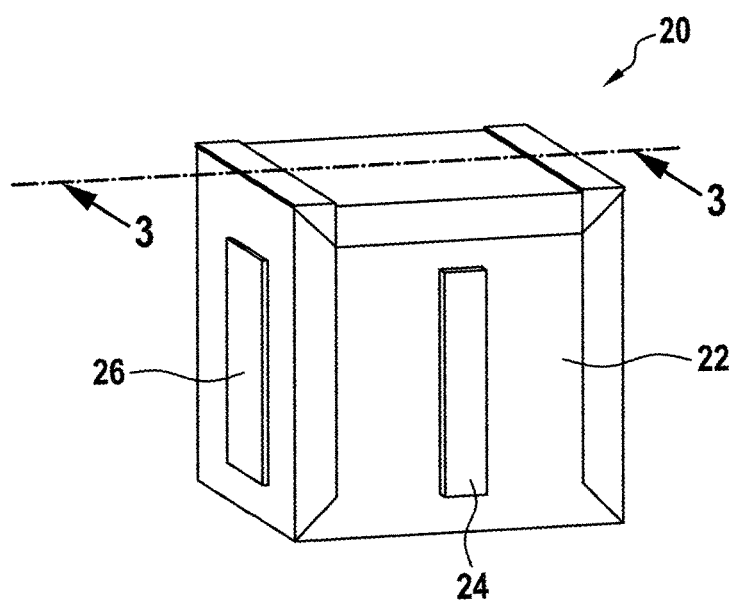
FIG. 2 is a perspective view of a pouch cell.
Figure 3:
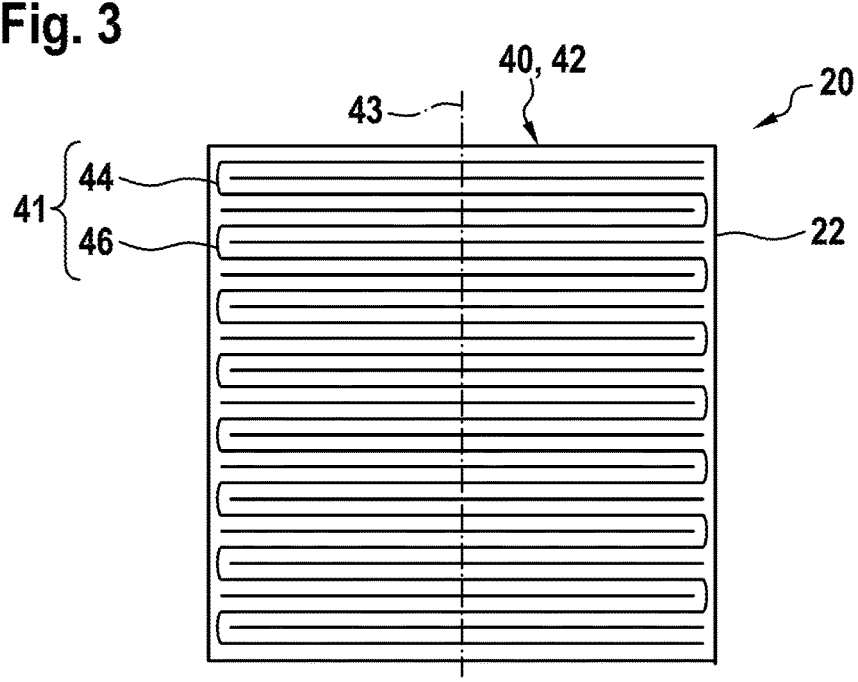
FIG. 3 is a schematic cross sectional view of the pouch cell of FIG. 2 as seen across line 3-3 of FIG. 2.
Figure 4:
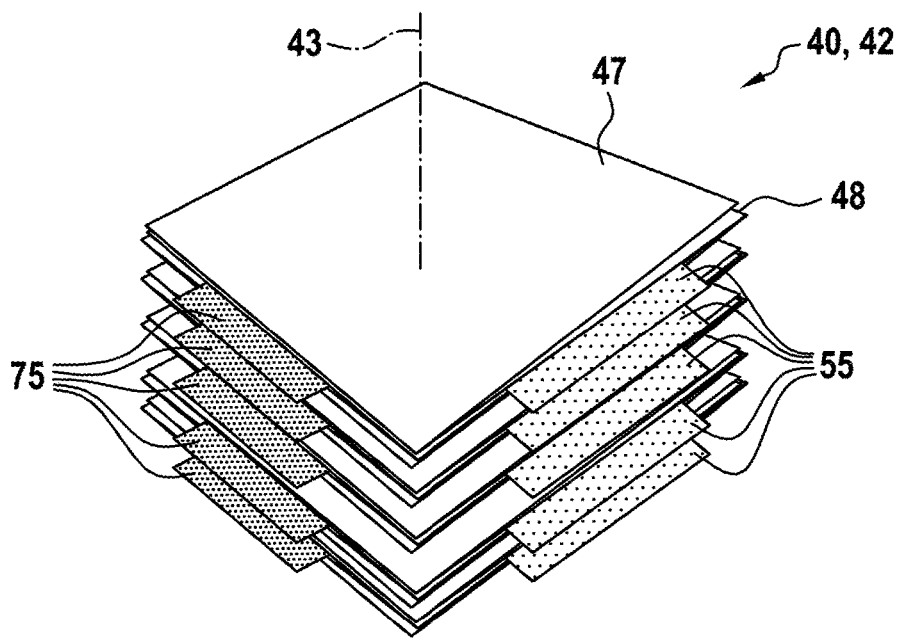
FIG. 4 is a perspective view of the electrode assembly.

Referring to FIGS. 1-4, a battery pack 1 used to provide electrical power includes an array of electrochemical cells 20 that are electrically interconnected and stored within a battery pack housing 2. The battery pack housing 2 includes a container portion 3 and a detachable lid 4. The cells 20 are lithium-ion pouch cells that include an electrode assembly 40 (FIG. 3) that is sealed within a cell housing 22 along with an electrolyte (for example, a lithium salt in an organic solvent) to form a power generation and storage unit. In some embodiments, groups of cells 20 may be bundled together to form battery modules (not shown), which in turn are stored within the battery pack housing 2. However, in the illustrated embodiment, the cells 20 are not bundled into modules and instead are directly electrically connected to battery pack housing terminals 5, 6. Within the battery pack housing 2, the cells 20 are electrically connected in series or in parallel.

Each cell 20 includes a pouch-type cell housing 22 formed of a metal laminated film. The cell housing 21 has a rectangular shape. In the illustrated embodiment, the cell housing 21 is cube shaped, and includes six orthogonal surfaces that together define a sealed interior space occupied by the electrode assembly 40. The electrode assembly 40 disposed in the cell 20 includes an electrode pair 41 that is cross-woven and folded together in such a way as to form an electrode stack 42, as described in detail below.

The electrode pair 41 includes a positive electrode 44, a negative electrode 46, a first separator 47 and a second separator 48. The electrodes 44, 46 and separators 47, 48 are elongate strips of material. As used herein, the term "strip" refers to a geometry that includes a width that is large (e.g., on the order of 100 times larger) relative to the thickness, and a length that is large (e.g., on the order of 1000 times larger) relative to the width. For example, in some applications, the electrodes 44, 46 may have a thickness of 0.04 mm to 0.10 mm, a width of 20 mm to 35 mm and a length of 20 m or more. Since the electrodes 44, 46 are very thin compared to the overall cell thickness (e.g. having a thickness on the order of tens or hundreds of mm), they are illustrated schematically in FIG. 3.

Referring to FIGS. 5 and 6, the positive and negative electrodes 44, 46 may each have a layered structure to facilitate insertion and/or movement of lithium-ions. For example, in the illustrated embodiment, the positive electrode 44 includes a first substrate 50 formed of a first electrically-conductive material such as copper. In addition, the positive electrode 44 includes a first active material 53 such as graphite disposed on both sides of the first substrate 50. The first active material 53 is provided along the entire length of the first substrate 50 for example in a printing process. The first active material 53 is applied such that a space exists between lengthwise edges 51, 52 of the positive electrode 44 and the first active material 53, whereby a positive clear lane of bare substrate is provided along each lengthwise edge 51, 52 of the positive electrode 44. The positive clear lanes are periodically notched (e.g., cut away) whereby positive tabs 55 are formed along the lengthwise edges 51, 52 of the positive electrode 44 between adjacent notches. The positive tabs 55 are electrically conductive and free of active material. In addition, the positive tabs 55a on one lengthwise edge 51 are offset along the length direction from the positive tabs 55b of the opposed lengthwise edge 52.

Figure 7:
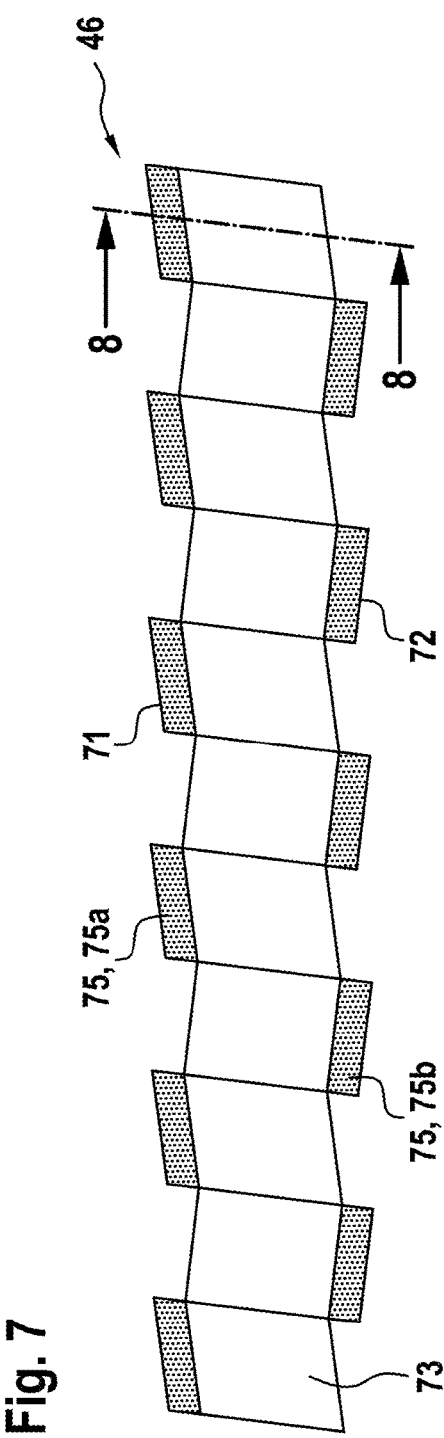
FIG. 7 is a perspective view of the negative electrode.
Figure 8:
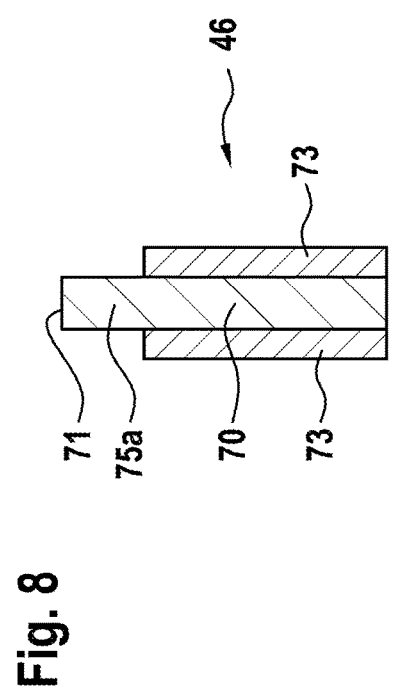
FIG. 8 is a cross-sectional view of the electrode of FIG. 7 as seen along line 8-8.

Referring to FIGS. 7 and 8, the negative electrode 46 includes a second substrate 70 formed of a second electrically-conductive material such as aluminum. In addition, the negative electrode 46 includes a second active material 73 such as a lithiated metal oxide coating disposed on both sides of the second substrate 70. The second active material 73 is provided along the entire length of the second substrate 70 for example in a printing process. The second active material 73 is applied such that a space exists between lengthwise edges 71, 72 of the negative electrode 46 and the second active material 73, whereby a negative clear lane of bare substrate is provided along each lengthwise edge 71, 72 of the negative electrode 43. The negative clear lanes are periodically notched whereby negative tabs 75 are formed along the lengthwise edges 71, 72 of the negative electrode 46 between adjacent notches. The negative tabs 75 are electrically conductive and free of active material 73. The negative tabs 75a on one lengthwise edge 71 are offset along the length direction from the negative tabs 75b of the opposed lengthwise edge 72.

Figure 9:
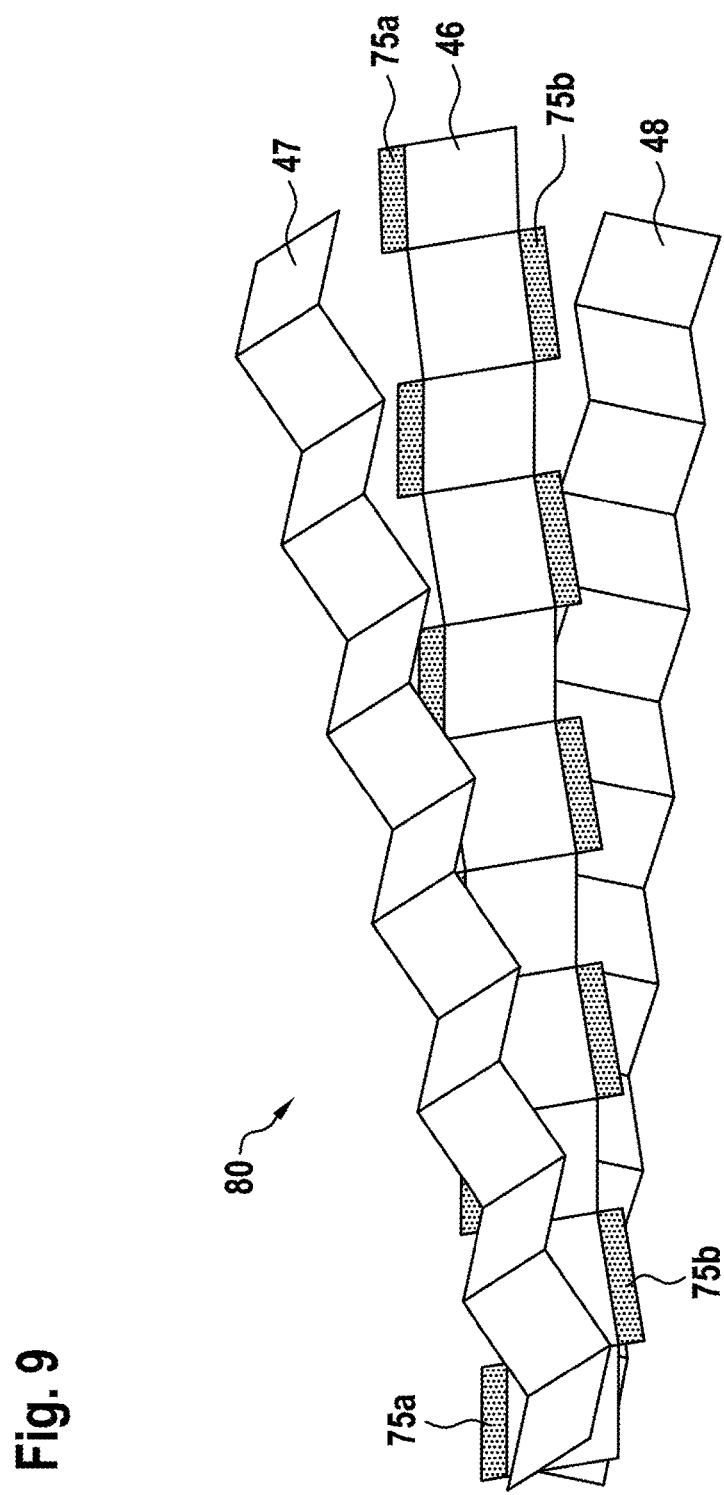
FIG. 9 is a perspective view of the alpha electrode in a fanned-out configuration showing the negative electrode disposed between a pair of separators.
Figure 10:
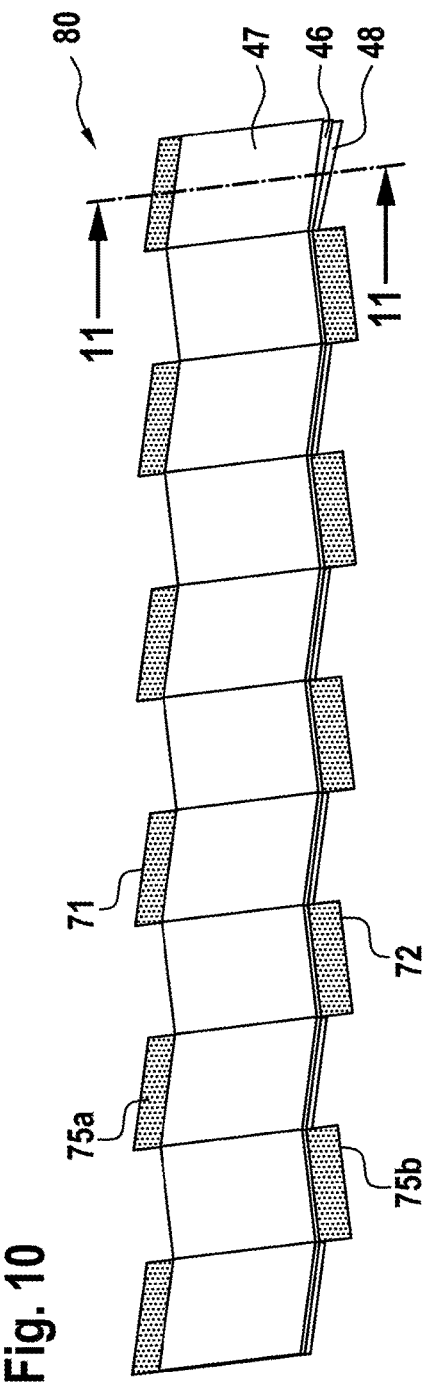
FIG. 10 is a perspective view of the alpha electrode in a stacked configuration including the negative electrode disposed between the pair of separators.
Figure 11:
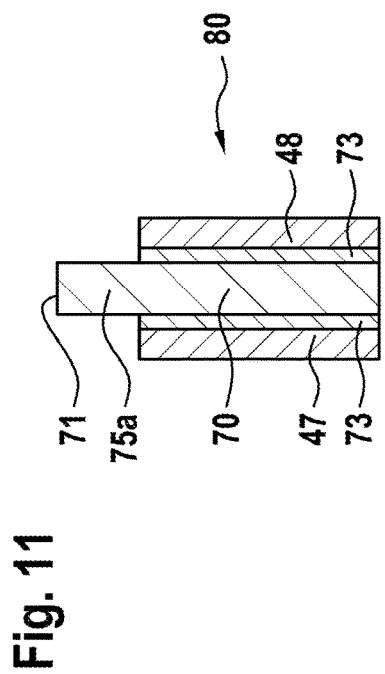
FIG. 11 is a cross-sectional view of the electrode of FIG. 10 as seen along line 11-11.

Referring to FIGS. 9-11, the first and second separators 47, 48 are each a permeable membrane that functions to keep the positive and negative electrodes 44, 46 apart to prevent electrical short circuits while also allowing passage of ionic charge carriers provided in the electrolyte and that are needed to close the circuit during the passage of current within the cell 20. The first and second separators 47, 48 are formed of an electrically insulating material such as a trilayer polypropylene-polyethylene-polypropylene membrane.

One of the positive electrode 44 and the negative electrode 46 is disposed between the first and second separators 47, 48 so as to be arranged in a layered configuration in which the electrode is sandwiched between the separators 47, 48 and forms a subassembly referred to hereafter as the alpha electrode 80. In the illustrated embodiment, the negative electrode 46 is disposed between the first and second separators 47, 48 and constitutes the alpha electrode 80 along with the first and second separators 47, 48. The other one of the positive electrode 44 and the negative electrode 46 is not disposed between separators (e.g., is separator free), and is referred to hereafter as the beta electrode 60. In the illustrated embodiment, the positive electrode 44 constitutes the beta electrode 60.

Like the positive and negative electrodes 44, 46, the alpha electrode 80 and the beta electrode 60 each have a thin, elongated shape and include a lengthwise dimension corresponding to the direction of elongation, a width dimension in a direction perpendicular to, and smaller than, the lengthwise dimension, and a thickness dimension in a direction perpendicular to both the lengthwise and width dimensions, the thickness dimension being smaller than the width dimension. In the alpha electrode 80, the tabs 75 of the negative electrode 46 protrude beyond the first separator 47 and the second separator 48 in the widthwise direction.

Referring again to FIG. 4, the alpha electrode 80 and the beta electrode 60 are each z-folded, and are cross-woven together during the z-folding process so to form the electrode stack 42. Within the electrode stack 42, generally planar portions of the alpha electrode alternate with generally planar portions of the beta electrode 60 in a layered configuration, and a stack axis 43 of the electrode stack 42 extends through a center of the electrode stack 42 in a direction parallel to the stacking direction and perpendicular to the planar portions. Details of the cross-woven and folded configuration of the electrode assembly 40 will now be described.

Figure 12:
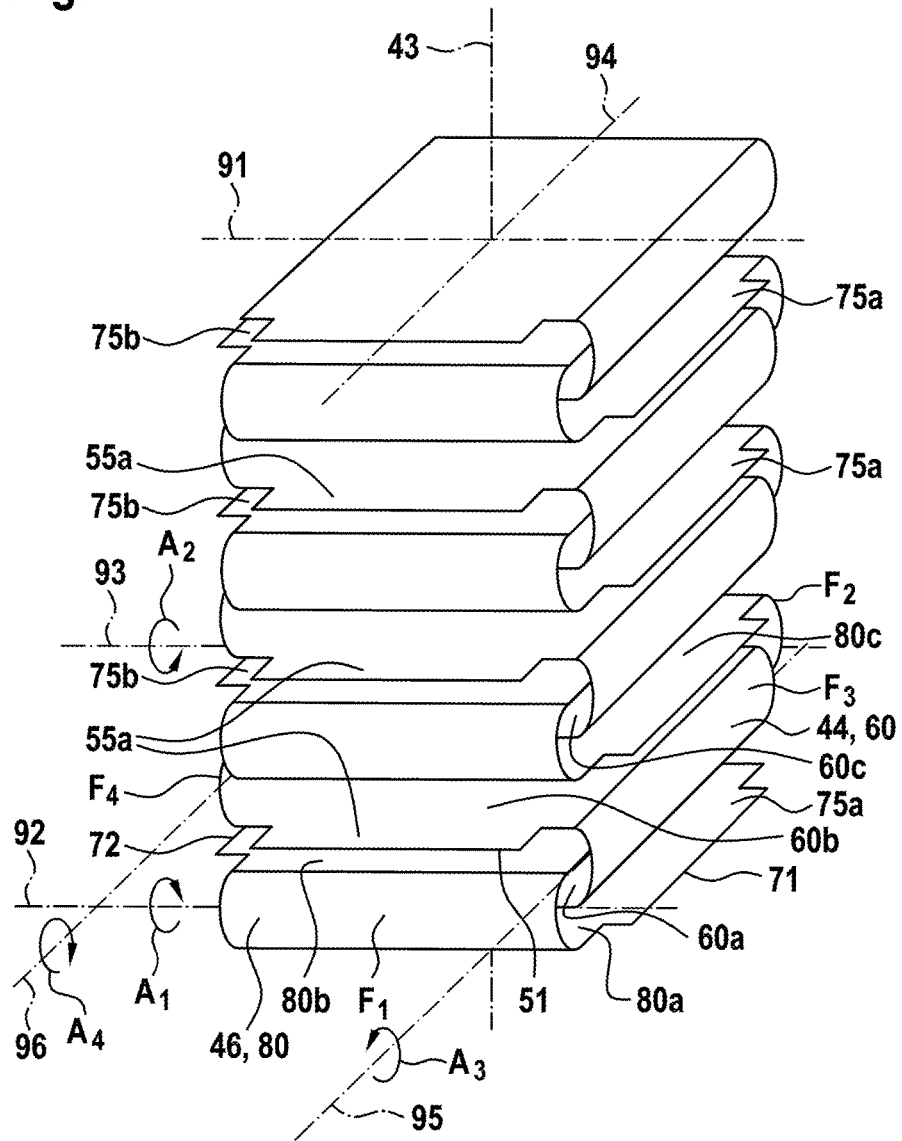
FIG. 12 is a schematic perspective view of the electrode assembly with the separators omitted for clarity.
Figure 13:
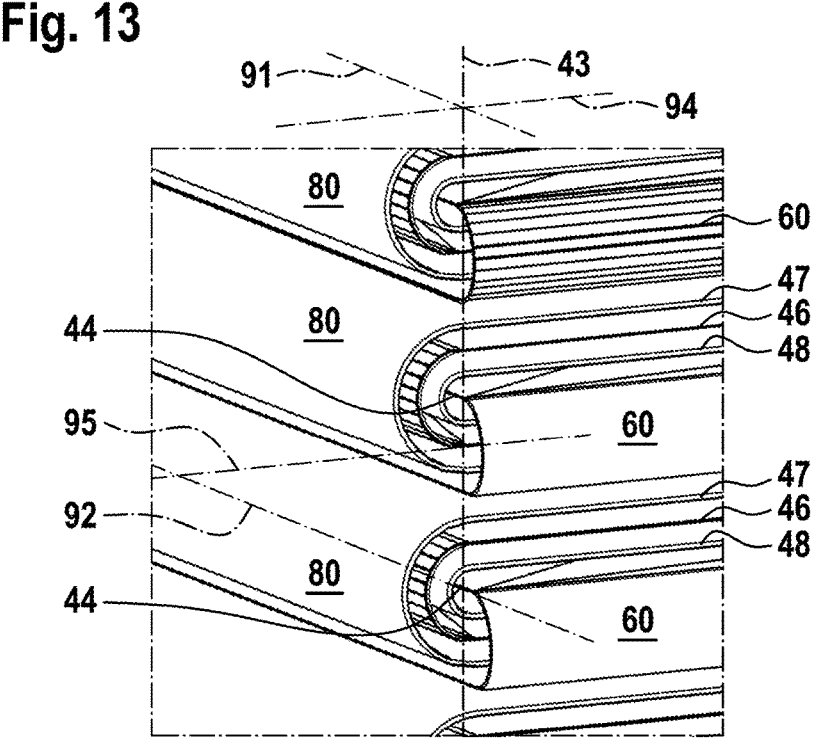
FIG. 13 is an enlarged perspective view of a corner of the electrode assembly including the separators.

Referring to FIGS. 12 and 13, the alpha electrode 80 is arranged in a continuous series of z folds. In each individual z-fold, the alpha electrode 80 is folded in a first direction A1 about an axis 92 parallel to a first fold axis 91 so that a second portion 80b of the alpha electrode 80 overlies a first portion 80a of the alpha electrode 80. The alpha electrode 80 is also folded in a second direction A2 about another axis 93 parallel to the first fold axis 91 so that a third portion 80c of the alpha electrode 80 overlies the first portion 80a of the alpha electrode 80. In the z-fold of the alpha electrode 80, the first direction A1 is opposed to the second direction A2, and the first portion 80a, the second portion 80b, and the third portion 80c of the alpha electrode 80 are arranged in a stacked configuration along the stack axis 43. The first fold axis 91 is perpendicular to the lengthwise edges 71, 72 of the negative electrode 46 and extends in the width direction of the negative electrode 46. In addition, the resulting folds F1, F2 in the alpha electrode about the axes 92, 93 are made at a location between adjacent pairs of opposed tabs 75a, 75b.

Like the alpha electrode 80, the beta electrode is 60 arranged in a continuous series of z folds. In each z-fold, the beta electrode 60 is folded in a third direction A3 about an axis 95 parallel to a second fold axis 94 so that a second portion 60b of the beta electrode 60 overlies a first portion 60a of the beta electrode 60. The beta electrode 60 is also folded in a fourth direction A4 about another axis 96 parallel to the second fold axis 94 so that a third portion 60c of the beta electrode 60 overlies the first portion 60a of the beta electrode 60. In the z-fold of the beta electrode 60, the third direction A3 is opposed to the fourth direction A4, and the second fold axis 94 is perpendicular to both the first fold axis 91 and the stack axis 43. The second fold axis 94 is perpendicular to the lengthwise edges 51, 52 of the positive electrode 44 and extends in the width direction of the positive electrode 44. In addition, the resulting folds F3, F4 in the beta electrode 60 about the axes 95, 96 are made at a location between adjacent pairs of opposed tabs 55a, 55b.

Prior to z-folding, the alpha and beta electrodes 80, 60 are arranged so that the lengthwise edges 51, 52 of the beta electrode 60 are perpendicular to the lengthwise edges 71, 72 of the alpha electrode 80, and the first portions 80a, 60a of each electrode 80, 60 are stacked. The alpha and beta electrodes 80, 60 so arranged are z-folded simultaneously in cross directions such that a z folds of the alpha electrode 80 are interwoven with the z folds of the beta electrode 60, and such that the first, second and third portions 60a, 60b, 60c of the beta electrode 60 are stacked along the stack axis 43 so as to alternate with the first, second and third portions 80a, 80b, 80c of the alpha electrode 80. That is, the first portion 60a of the beta electrode 60 is layered between the first and second portions 80a, 80b of the alpha electrode 80, the second portion 60b of the beta electrode 60 is layered between the second and third portions 80b, 80c of the alpha electrode 80, and the third portion 60c of the beta electrode 60 overlies the third portion 80c of the alpha electrode 80.

In this configuration, the tabs 55a, 55b, 75a, 75b are positioned between the respective folds F1, F2, F3, F4. The positive tabs 55a corresponding to one lengthwise edge 51 of the positive electrode 44 are disposed on an opposed side of the electrode stack 42 from the positive tabs 55b of the opposed lengthwise edge 52. In addition, the negative tabs 75a on one lengthwise edge 71 of the negative electrode 46 are disposed on an opposed side of the electrode stack 42 from the negative tabs 75b of the opposed lengthwise edge 72, and on an adjacent side of the electrode stack 42 from the positive tabs 55a, 55b.

Figure 14:
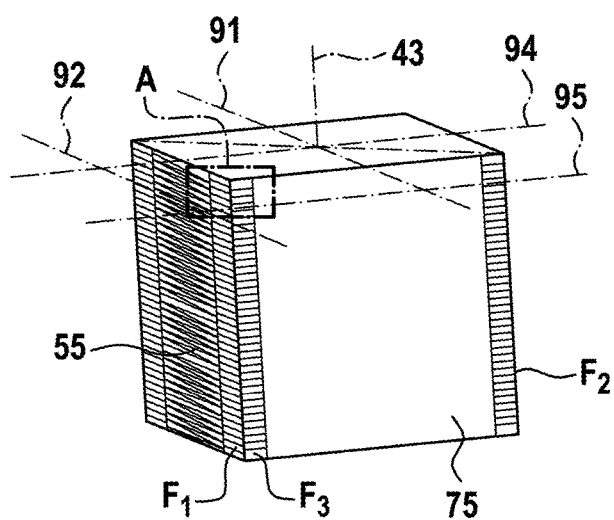
FIG. 14 is a perspective view of the electrode assembly for use as a legend for FIG. 15.
Figure 15:
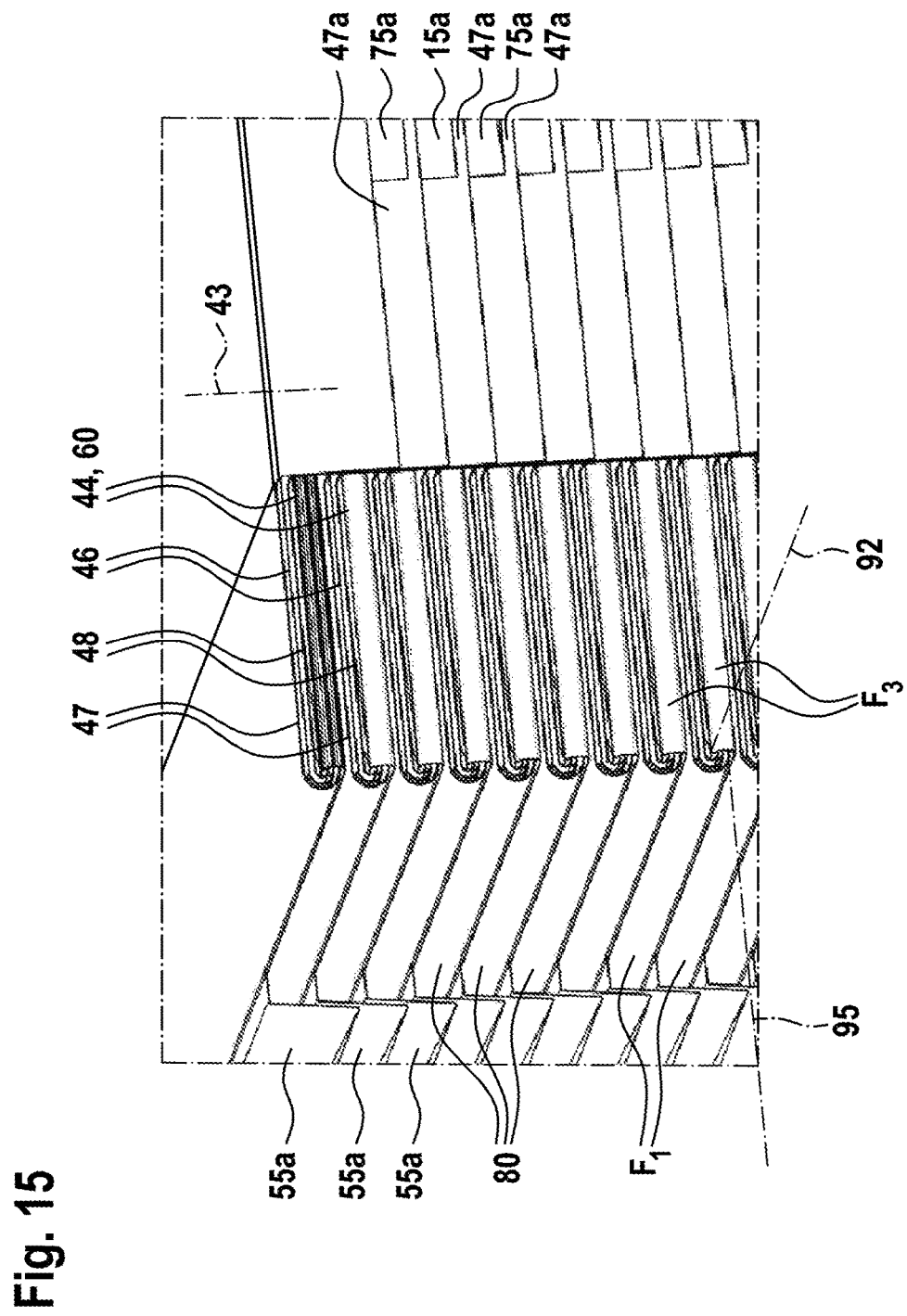
FIG. 15 is a perspective view of the portion of the electrode assembly of FIG. 14 identified by the area A.

Referring also to FIGS. 14 and 15, in some embodiments, the tabs 55a, 55b, 75a, 75b are folded over the corresponding side of the electrode stack 42 so as to overlie the side of the electrode stack 42. Due to the stacked and layered configuration of the electrode portions within the electrode stack 42, the folded tabs on a given side of the electrode stack 42 overlie each other and are slightly offset along the direction of the stack axis 43, and thus have the appearance of louvers. For example, as seen in FIG. 15, the positive tabs 55a overlie the folds F1 and each other on one side of the electrode stack 42, and the negative tabs 75a overlie the folds F3 and each other along an adjacent (orthogonal) side of the electrode stack 42. In order to ensure that the folded negative tabs 75a, 75b are prevented from contacting the beta (positive) electrode 60 in the vicinity of the fold F3, the first and second separators 47, 48 may also include tabs 47a, 48a. Only tab 47a is seen in the view of FIG. 15, and the tab 48a corresponding to the second separator 48 underlies tab 47a and thus is hidden from view. The negative tab 75a is provided in sufficient length to protrude beyond the separator tabs 47a, 48a, whereby the negative tabs 75 can form an electrical connection for example with a current collector (not shown).

Referring again to FIG. 2, in some embodiments, the cell 20 further includes a positive current collector (not shown) that is electrically connected to one or more of the positive tabs 55 of the positive electrode 44 and is configured to direct current to a positive terminal 24 disposed on an outside of the cell housing 22. In addition, the cell 20 further includes a negative current collector (not shown) that is electrically connected to one or more of the negative tabs 75 of the negative electrode 46 and is configured to direct current to a negative terminal 26 disposed on an outside of the cell housing 22.

Figure 16:
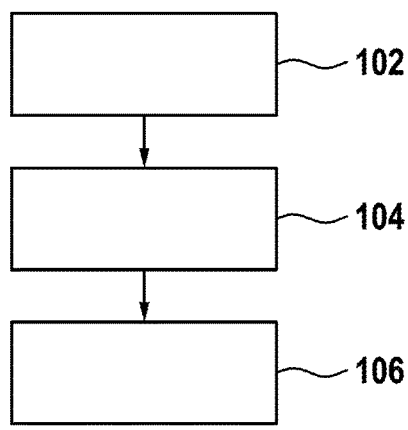
FIG. 16 is a flow chart illustrating a method of forming an electrode assembly.
Figure 17:
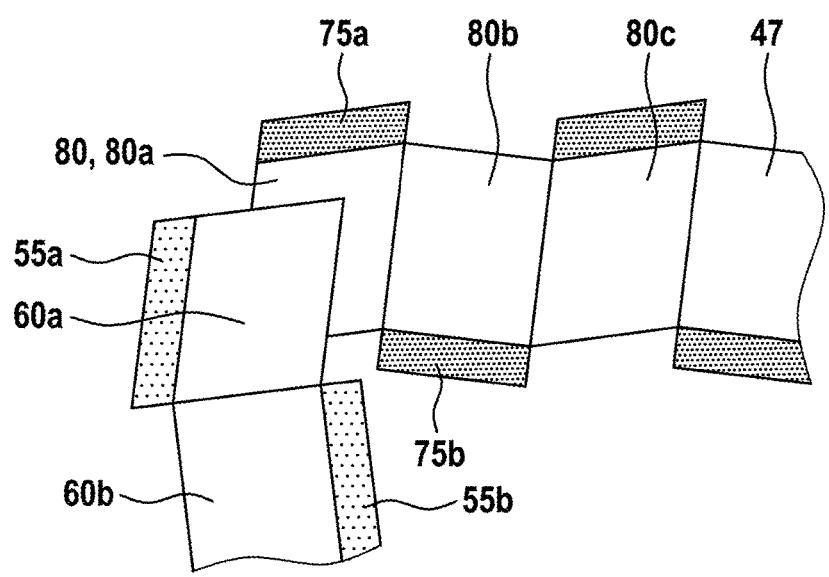
FIGS. 17 and 18 illustrate the interweaving and z-folding of the electrodes to form the electrode assembly.
Figure 18:
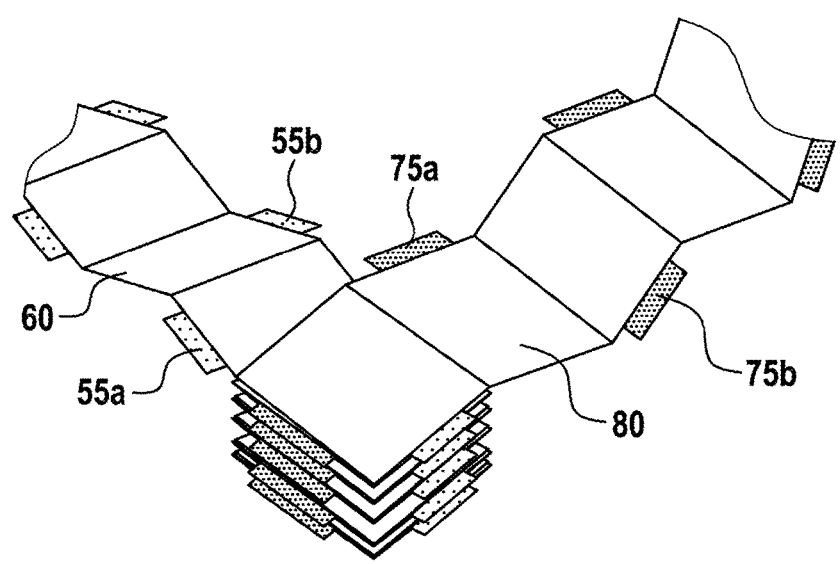

Referring also to FIGS. 16-18, a method of forming a cross-woven z-folded electrode assembly includes the following method steps: The electrode pair 41 is provided in which one of the positive electrode 44 and the negative electrode 46 is disposed between the first separator 47 and the second separator 48 to form the alpha electrode. The other one of the positive electrode 44 and the negative electrode 46 is used as the beta electrode 60 (Step 102, FIG. 16).

Prior to folding and cross-weaving, leading edge portions 80a, 60a of each of the alpha electrode 80 and the beta electrode 60 are stacked such that a lengthwise edge 71 of the alpha electrode 80 extends in a direction perpendicular to a lengthwise edge 51 of the beta electrode 60 (FIG. 17).

The alpha electrode 80 is then arranged in a first series of z folds as described above with respect to FIG. 12 (Step 104). While the alpha electrode is arranged into the first series of z-folds, the beta electrode 60 is also (e.g., simultaneously) arranged in a second series of z folds as described above with respect to FIG. 12, and interwoven with the first series of z-folds to provide an electrode stack 42 (Step 106, FIG. 18). In some embodiments, the interweaving of the first series of z-folds with the second series of z folds is achieved as follows. The leading edge portion (first portion) 80a of the alpha electrode 80 is arranged so as to underlie the leading edge portion (first portion) 60a of the beta electrode 60, and the alpha electrode 80 is then folded about the axis 92 such that the second portion 80b of the alpha electrode 80 overlies the leading edge portion 60a of the beta electrode 60. The beta electrode 60 is then folded about the axis 95 such that the second portion 60b of the beta electrode overlies the second portion 80b of the alpha electrode 80. The alpha electrode 80 is then folded about the axis 93 such that a third portion 80c of the alpha electrode 80 overlies the second portion 60b of the beta electrode 60. The beta electrode 60 is then folded about the axis 96 such that the third portion 60c of the beta electrode 60 overlies the third portion 80c of the alpha electrode 80. This procedure provides a single cross-woven z-fold of the alpha and beta electrodes 80, 60 including portions 80a, 60a, 80b, 60b, 80c, 60c that are stacked along the stack axis 43. This procedure can be repeated continuously to provide the series of cross-woven z folds, where the number of z-folds in the series is limited by the length of the positive and negative electrodes 44, 46 used to form the assembly.

The electrode assembly 40 that results from this method provides a stacked arrangement has a volumetric efficiency that is comparable to the volumetric efficiency of some electrode assemblies including a stacked arrangement of individual electrode plates, but is easier to manufacture and less prone to defects due to the continuous nature of the cross-woven z folding process.

Although the alpha electrode 80 described herein includes the negative electrode 46 sandwiched between a pair of separators 47, 48, and the beta electrode 60 includes the positive electrode 44 that is free of separators, the electrode assembly 40 is not limited to this configuration. For example, in some embodiments, the alpha electrode 80 includes the positive electrode 44 sandwiched between the pair of separators 47, 48, and the beta electrode 60 includes the negative electrode 46 that is free of separators. In other embodiments, alpha electrode 80 includes the positive electrode 44 sandwiched between the pair of separators 47, 48, and the beta electrode 60 includes the negative electrode 46 sandwiched between a second pair of separators (not shown).

Although the positive and negative electrodes 44, 46 are described as having tabs 55, 75 formed along each lengthwise edge, the positive and negative electrodes 44, 46 are not limited to this configuration. For example, in some embodiments, the positive and/or negative electrodes 60, 80 have tabs 55, 75 formed along one lengthwise edge, and the opposed lengthwise edge is free of tabs 55, 75. In this example, the active material may be deposited on the electrode surface up to the tab-free lengthwise edge, providing increased productivity and thus a more volumetrically efficient cell.

Although exemplary materials have been described for use in forming the positive electrode 44 including the first substrate 50 and first active material 53, the negative electrode 46 including the second substrate 70 and second active material 73, and the separators 47, 48, it is contemplated that other materials may be used, and that the materials used to form the positive electrode 44, the negative electrode 46, and/0 the separators 47, 48 will be determined by the requirements of the specific application.

Although the cell housing 21 is described herein as being a pouch cell housing formed of a metal laminated film, the cell housing 21 is not limited to this material or configuration. For example, the cell housing 21 may be formed of other materials and/or may be formed having a prismatic, cylindrical or other configuration.

Although the cells 20 are described herein as being lithium-ion cells, they are not limited to this type of cell chemistry. For example, is some embodiments, the cells 20 may be nickel-cadmium, nickel-metal-hydride, lead-acid or other type of cell chemistry.

Selective illustrative embodiments of the battery cell and electrode assembly are described above in some detail. It should be understood that only structures considered necessary for clarifying these devices have been described herein. Other conventional structures, and those of ancillary and auxiliary components of the battery system, are assumed to be known and understood by those skilled in the art. Moreover, while working examples of the battery cell and electrode assembly been described above, the battery cell and/or electrode assembly is not limited to the working examples described above, but various design alterations may be carried out without departing from the devices as set forth in the claims.

What is claimed is:
1. An electrode assembly comprising
   a positive electrode, and
   a negative electrode,
   wherein the positive electrode comprises a first substrate formed of a first electrically-conductive material, the positive electrode having a first active material disposed on both sides of the first substrate, the negative electrode comprises a second substrate formed of a second electrically-conductive material, the negative electrode having a second active material disposed on both sides of the second substrate, one of the positive electrode and the negative electrode is disposed between a first separator and a second separator to form an alpha electrode, and the other one of the positive electrode and the negative electrode forms a beta electrode, opposed lengthwise edges of each of the alpha electrode and the beta electrode are periodically notched and tabs are formed along the lengthwise edges between adjacent notches, and for each of the alpha electrode and the beta electrode, the notches on one lengthwise edge are offset along the length direction from the notches of an opposed lengthwise edge, and the tabs are electrically conductive and free of active material, the alpha electrode is arranged in a series of z folds in which the alpha electrode is folded in a first direction about an axis parallel to a first fold axis so that a second portion of the alpha electrode overlies a first portion of the alpha electrode, and folded in a second direction about another axis parallel to the first fold axis so that a third portion of the alpha electrode overlies the first portion of the alpha electrode, the first direction being opposed to the second direction, and the first portion of the alpha electrode, the second portion of the alpha electrode, and the third portion of the alpha electrode being arranged in a stacked configuration defining a stack axis, the beta electrode is arranged in a series of z folds in which the beta electrode is folded in a third direction about an axis parallel to a second fold axis so that a second portion of the beta electrode overlies a first portion of the beta electrode, and folded in a fourth direction about another axis parallel to the second fold axis so that a third portion of the beta electrode overlies the first portion of the beta electrode, the third direction being opposed to the fourth direction, and the second fold axis being perpendicular to the first fold axis and the stack axis, and the z folds of the alpha electrode are woven with the z folds of the beta electrode such that the first, second and third portions of the beta electrode are stacked along the stack axis so as to alternate with the first, second and third portions of the alpha electrode.

2. The electrode assembly of claim 1, wherein the alpha electrode and the beta electrode each have a thin, elongated shape and include a lengthwise dimension corresponding to the direction of elongation, a width dimension in a direction perpendicular to, and smaller than, the lengthwise dimension, and a thickness dimension in a direction perpendicular to both the lengthwise and width dimensions, the thickness dimension being smaller than the width dimension, and wherein the first fold axis is perpendicular to the lengthwise dimension of the alpha electrode, and the second fold axis is perpendicular to the lengthwise dimension of the beta electrode.

3. The electrode assembly of claim 1, wherein
the first electrically-conductive material is different from the second electrically-conductive material, and the first active material is different from the second active material.

4. The electrode assembly of claim 1, wherein
the first active material is provided along the entire length of the first substrate such that a space exists between lengthwise edges of the positive electrode and the first active material, whereby a positive clear lane of bare substrate is provided along each lengthwise edge of the positive electrode, and the second active material is provided along the entire length of the second substrate such that a space exists between lengthwise edges of the negative electrode and the second active material, whereby a negative clear lane of bare substrate is provided along each lengthwise edge of the negative electrode.

5. The electrode assembly of claim 4, wherein
the positive clear lanes are periodically notched such that positive tabs are formed along the lengthwise edges of the positive electrode between adjacent notches, and the negative clear lanes are periodically notched such that negative tabs are formed along the lengthwise edges of the negative electrode between adjacent notches.

6. The electrode assembly of claim 5, wherein the tabs of the alpha electrode protrude beyond the first separator and the second separator.

7. The electrode assembly of claim 5, wherein the positive tabs on one lengthwise edge of the positive electrode are offset along the length direction from the positive tabs of an opposed lengthwise edge of the positive electrode, and the negative tabs on one lengthwise edge of the negative electrode are offset along the length direction from the negative tabs of an opposed lengthwise edge of the negative electrode.

8. The electrode assembly of claim 1, wherein the tabs of the alpha electrode protrude beyond the first separator and the second separator.

9. The electrode assembly of claim 1, wherein the other one of the positive electrode and the negative electrode is free of separators.

10. An electrode assembly comprising
a positive electrode, and
a negative electrode, wherein
the positive electrode comprises a first substrate formed of a first electrically-conductive material, the positive electrode having a first active material disposed on both sides of the first substrate, the negative electrode comprises a second substrate formed of a second electrically-conductive material, the negative electrode having a second active material disposed on both sides of the second substrate, one of the positive electrode and the negative electrode is disposed between a first separator and a second separator to form an insulated electrode, opposed lengthwise edges of each of the first substrate and the second substrate are periodically notched and tabs are formed along the lengthwise edges between adjacent notches, and for each of the positive electrode and the negative electrode the notches on one lengthwise edge are offset along the length direction from the notches of an opposed lengthwise edge, and the tabs are electrically conductive and free of active material, the insulated electrode is arranged in z-folds about first fold lines that are parallel to a first axis, the other of the positive electrode and the negative electrode is arranged in z-folds about second fold lines that are parallel to a second axis, and the second axis is perpendicular to the first axis, the insulated electrode is cross-woven with the other of the positive electrode and the negative electrode such that portions of the insulated electrode between adjacent first fold lines are stacked in an alternating manner with portions of the other of the positive electrode and the negative electrode between adjacent second fold lines to form an assembly of the portions that is stacked along a third axis that is perpendicular to both the first axis and the second axis.

11. An electrochemical cell including a cell housing, and an electrode assembly disposed in the cell housing, the electrode assembly including a positive electrode, and a negative electrode, wherein the positive electrode comprises a first substrate formed of a first electrically-conductive material, the positive electrode having a first active material disposed on both sides of the first substrate, the negative electrode comprises a second substrate formed of a second electrically-conductive material, the negative electrode having a second active material disposed on both sides of the second substrate, one of the positive electrode and the negative electrode is disposed between a first separator and a second separator to form an alpha electrode, and the other one of the positive electrode and the negative electrode forms a beta electrode, opposed lengthwise edges of each of the alpha electrode and the beta electrode are periodically notched and tabs are formed along the lengthwise edges between adjacent notches, and for each of the alpha electrode and the beta electrode, the notches on one lengthwise edge are offset alone the length direction from the notches of an opposed lengthwise edge, and the tabs are electrically conductive and free of active material, the alpha electrode is arranged in a series of z folds in which the alpha electrode is folded in a first direction about an axis parallel to a first fold axis so that a second portion of the alpha electrode overlies a first portion of the alpha electrode, and folded in a second direction about another axis parallel to the first fold axis so that a third portion of the alpha electrode overlies the first portion of the alpha electrode, the first direction being opposed to the second direction, and the first portion of the alpha electrode, the second portion of the alpha electrode, and the third portion of the alpha electrode being arranged in a stacked configuration defining a stack axis, the beta electrode is arranged in a series of z folds in which the beta electrode is folded in a third direction about an axis parallel to a second fold axis so that a second portion of the beta electrode overlies a first portion of the beta electrode, and folded in a fourth direction about another axis parallel to the second fold axis so that a third portion of the beta electrode overlies the first portion of the beta electrode, the third direction being opposed to the fourth direction, and the second fold axis being perpendicular to the first fold axis and the stack axis, the z folds of the alpha electrode are woven with the z folds of the beta electrode such that the first, second and third portions of the beta electrode are stacked along the stack axis so as to alternate with the first, second and third portions of the alpha electrode.

12. A method of forming an electrode assembly comprising a positive electrode, and a negative electrode, the positive electrode comprises a first substrate formed of a first electrically-conductive material, the positive electrode having a first active material disposed on both sides of the first substrate, the negative electrode comprises a second substrate formed of a second electrically-conductive material, the negative electrode having a second active material disposed on both sides of the second substrate, wherein the method includes disposing one of the positive electrode and the negative electrode between a first separator and a second separator to form an alpha electrode, and using the other one of the positive electrode and the negative electrode to form a beta electrode, arranging the alpha electrode in a first series of z folds, while arranging the alpha electrode in the first series of z-folds, also arranging the beta electrode in a second series of z folds that is interwoven with the first series of z-folds to provide an electrode stack in which portions of the beta electrode are stacked along a stack axis so as to alternate with portions of the alpha electrode, and wherein opposed lengthwise edges of each of the alpha electrode and the beta electrode are periodically notched and tabs are formed along the lengthwise edges between adjacent notches, and for each of the alpha electrode and the beta electrode, the notches on one lengthwise edge are offset along the length direction from the notches of an opposed lengthwise edge, and the tabs are electrically conductive and free of active material.

13. The method of claim 12, wherein the step of arranging the alpha electrode in a first series of z folds includes arranging the alpha electrode such that each z fold in the first series of z folds includes folding the alpha electrode in a first direction about an axis parallel to a first fold axis so that a second portion of the alpha electrode overlies a first portion of the alpha electrode, and folding the alpha electrode in a second direction about another axis parallel to the first fold axis so that a third portion of the alpha electrode overlies the first portion of the alpha electrode, the first direction being opposed to the second direction, and the first portion of the alpha electrode, the second portion of the alpha electrode, and the third portion of the alpha electrode being arranged in a stacked configuration defining the stack axis, and the step of arranging the beta electrode in a second series of z folds includes arranging the beta electrode such that each z-fold in the second series of z folds includes folding the beta electrode in a third direction about an axis parallel to a second fold axis so that a second portion of the beta electrode overlies a first portion of the beta electrode, and folding the beta electrode in a fourth direction about another axis parallel to the second fold axis so that a third portion of the beta electrode overlies the first portion of the beta electrode, the third direction being opposed to the fourth direction, and the second fold axis being perpendicular to the first fold axis and the stack axis.

14. The method of claim 13, wherein interweaving the second series of z folds with the first series of z folds provides an electrode stack in which the first, second and third portions of the beta electrode are stacked along the stack axis so as to alternate with the first, second and third portions of the alpha electrode.

15. The method of claim 13 wherein the alpha electrode and the beta electrode each have a thin, elongated shape and include a lengthwise dimension corresponding to the direction of elongation, a width dimension in a direction perpendicular to, and smaller than, the lengthwise dimension, and a thickness dimension in a direction perpendicular to both the lengthwise and width dimensions, the thickness dimension being smaller than the width dimension, and the steps of arranging the alpha electrode and arranging the beta electrode include orienting the alpha electrode and the beta electrode such that the lengthwise dimension of the alpha electrode is perpendicular to the lengthwise dimension of the beta electrode.

16. The method of claim 12 wherein prior to the steps of arranging the alpha electrode and arranging the beta electrode, stacking first portions of each of the alpha electrode and the beta electrode such that a lengthwise edge of the alpha electrode extends in a direction perpendicular to a lengthwise edge of the beta electrode.

* * * * *